United States Patent [19]

Harakawa

[11] 3,878,414
[45] Apr. 15, 1975

[54] ELECTRIC MOTOR ARRANGEMENT
[75] Inventor: Mototaka Harakawa, Shizuoka, Japan
[73] Assignee: Star Seimitsu Kabushiki Kaisha (Star Mfg. Co., Ltd.), Shizuoka-ski, Shizuoka-ken, Japan
[22] Filed: Nov. 21, 1973
[21] Appl. No.: 418,040

[30] Foreign Application Priority Data
Nov. 22, 1972 Japan.............................. 47-117473
Nov. 30, 1972 Japan.............................. 47-120190

[52] U.S. Cl.................. 310/156; 310/162; 310/164
[51] Int. Cl............................................. H02k 21/12
[58] Field of Search.................... 310/156, 162–164, 310/263

[56] References Cited
UNITED STATES PATENTS
| | | | |
|---|---|---|---|
| 2,415,022 | 1/1947 | Morrison | 310/162 X |
| 2,780,764 | 2/1957 | Morrison | 310/163 X |
| 3,469,131 | 9/1969 | Stellwagen | 310/162 |

*Primary Examiner*—Donovan F. Duggan
*Attorney, Agent, or Firm*—Holman & Stern

[57] ABSTRACT

An electric motor arrangement comprises a rotor being formed as a single rotatable disc made of soft magnetic material, the disc having a plurality of radially projecting rotor poles disposed equidistantly on its periphery, each of the rotor poles having a turn-up axial projection; a concentric disc-shaped permanent magnet being mounted fixedly to the lower surface of the disc; a rotor shaft, the disc and the permanent magnet being mounted fixedly on the rotor shaft; a stator plate consisting of a pair of parallel arms which form stator elements and are disposed at a 180°— offset manner, the arms having a plurality of diametrically opposed stator poles disposed concentrically to the disc, the stator poles being disposed with a pre-determined air gap from the rotor poles and arranged at equal pitches with the rotor poles; and an energizing coil being wound on one of the arms of the stator plate, the permanent magnet magnetizing the rotor poles to a pre-determined magnetic polarity and the stator poles to the opposite magnetic polarity thereby preventing fluxes flowing to the rotor poles and the stator poles from causing axial forces in the rotor shaft and thus providing a large torque to the rotor shaft at a small input power.

3 Claims, 21 Drawing Figures

FIG. 8
CONVENTIONAL
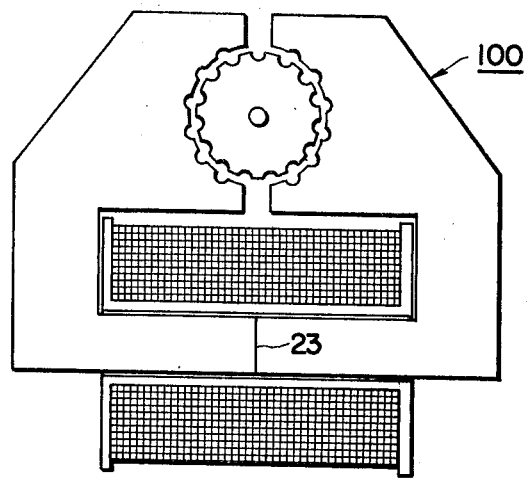

3,878,414

ELECTRIC MOTOR ARRANGEMENT

This invention relates to improvements in and relating to a miniature electric motor arrangement for an electronic timepiece wherein the oscillation of a high precision time base, such as a tuning fork, a tuning lead, a quartz oscillator or the like, is frequency-divided through electronic circuit means to a usable lower frequency pulse series for driving, in synchronism therewith, a motor built-in the timepiece.

In a representative motor arrangement of the above kind, the circuit constants of the electronic circuits included therein are so selected that the motor is rotatable at such revolutions per minute as corresponding to a frequency close to that of the synchronizing signal pulses fed to the motor. In this case, the synchronizing signal pulses are fed to the drive circuit for the motor in an electrically overlapped way so that the rotation of the motor is forcibly brought into synchronism with the synchronizing signal pulses.

In a well-known motor arrangement of a similar kind as disclosed in U.S. Pat. No. 3,469,131, the rotor of the motor comprises two separated and physically parallel, soft magnetic discs, each having a series of diametrically projecting and equidistantly arranged peripheral poles, and a permanent disc magnet sandwiched by and between the soft magnetic discs is designed and arranged to magnetize the one pole series on one of the discs to have one magnetic polarity and the other pole series on the other disc to have the opposite magnetic polarity.

In the former type of the known electric motor, the circuit constants must be necessarily so selected so as to adapt to the required number of motor revolutions closely related to the predetermined synchronizing pulse series. Fulfillment of this requirement may be frequently disturbed, especially when seen from the mass productive point of view, by occasional variation in the source voltage and/or ambient temperature and the like, as met in the practical running of the motor. An adjustable arrangement of circuit constants will fatal to IC-lization of the electronic circuits contained.

In the latter conventional type motor having a permanent magnet sandwiched by and between the soft magnetic discs, as referred to above, the magnet must be fabricated with utmost case and high precision dimensional tolerances, especially of the thickness thereof, in spite of inferior machinability of better magnetic material. Secondly, the torque requirement will only be satisfied by keeping a predetermined phase angle amoung the magnetic poles of the two soft magnetic discs. Thirdly, it is preferably and advantageously required to set the thickness of the stator to be substantially equal to the sum of those of the discs and the permanent magnet. For satisfying this requirement, a considerable amount of high cost and high grade soft magnetic material such as permalloy or the like nickel alloy must be consumed in the fabrication of the motor. This necessity is highly disadvantageous when an increase of the thickness of the permanent magnet is to be scheduled for intensifying the magnetizing force of related motor parts, so as to improve the motor efficiency. With use of the sandwiched permanent magnet and pole disc assembly of the aforementioned mode, a substantially disadvantageous increase in the weight as well as moment of inertia could not be avoided which may result in turn in a disadvantageous instability of the rotor during the steady running of the motor.

SUMMARY OF THE INVENTION

The main object of the present invention is to provide a miniature electric motor adapted for use in electronic timepieces and of a simpler design, mass-productive powerful and of high efficiency and operating stability by obviating substantially the aforementioned several conventional drawbacks above-mentioned.

These and further objects, features and advantages of the invention will become more apparent when read in conjunction with the following detailed description of the invention by way of example of several preferred embodiments thereof by reference to the accompanying drawings.

BRIEF DESCRIPTION OF THE DRAWINGS

In the drawings:

FIG. 8 is a plan view of a conventional comparative motor stator.

DETAILED DESCRIPTION OF THE PREFERRED EMBODIMENTS

Figure 1:
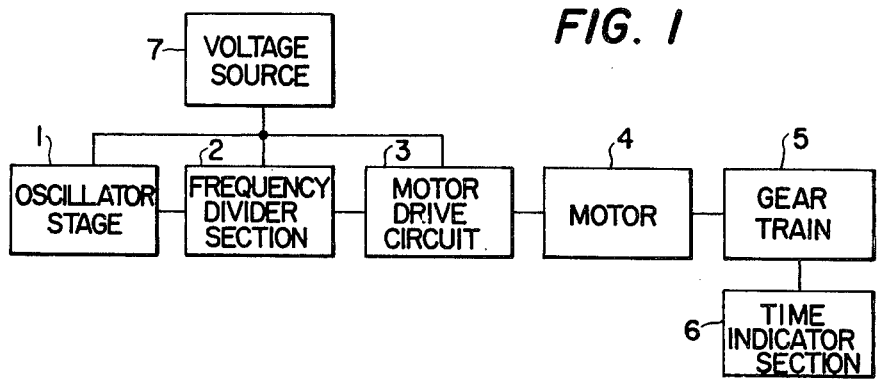
FIG. 1 is a block diagram of an electronic watch to which the principles of the present invention can be applied.

In FIG. 1, showing an electronic quartz oscillator watch, as a representative of modern electronic watches, numeral 1 represents an oscillator section adapted for generating a series of timebase signal pulses, 4 megahertz as an example, by energizing a quartz oscillator, not specifically shown on account of its very popularity. Numeral 2 represents a frequency divider section comprising a number of flip-flops and adapted for reducing the frequency of the higher output pulse series from the foregoing stage 1 to a suitable lower frequency pulses such as several tens hertz pulses for driving a motor to be described. Numeral 3 represents a motor drive circuit stage comprising a shaper adapted for shaping the output from the foregoing stage. Numeral 4 represents a motor fed with drive pulses from the foregoing stage 3. Numeral 5 represents a conventional time-indicating gear train mechanically coupled with the rotor to be described, of the motor 4. Numeral 6 represents a conventional time indicator section comprising an hour hand, a minute hand and a seconds hand although not shown. Numeral 7 represents a voltage source, preferably a battery which is arranged to feed voltage to several sections 1–3. Although not shown, each of the sections 1–3 consists normally of a one-chip IC.

Figure 2:
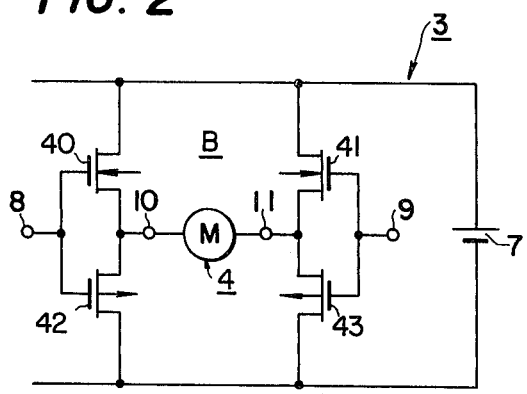
FIG. 2 is a connection diagram showing a drive circuit arrangement adapted for drive of the motor according to this invention.

The motor section 4 is shown specifically in FIG. 2.

In this motor section 4, P-channel MOS-transistors 40; 41 and N-channel MOS-transistors 42; 43 are connected one after another, so as to provide a bridge B having diagonal terminals 10 and 11, the motor 4 being inserted therebetween as shown. The voltage source 7 is connected across the series connection of MOS-transistors 41; 43. Input terminals 8 and 9 are provided and connected as shown.

Figure 3A:
FIGS. 3A–3F represent several charts showing several wave forms appearing at several places of the circuit arrangement shown in FIG. 2.
Figure 3C:
Figure 3B:
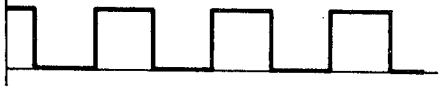
Figure 3D:
Figure 3E:
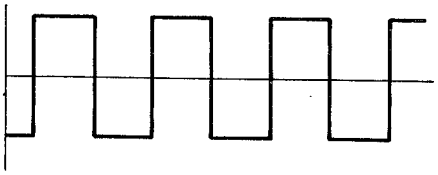
Figure 3F:
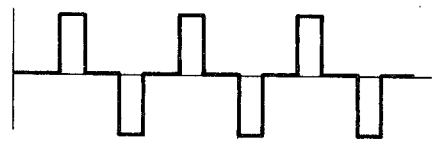

When mutually 180°-phase-shifted signal series shown in FIGS. 3A and 3B or 3C and 3D are impressed upon the input terminals 8 and 9, respectively, signal series as shown in FIG. 3E or 3F, respectively, will appear between the motor input terminals 10 and 11. These signals are of alternating pulses as shown.

Figure 4:
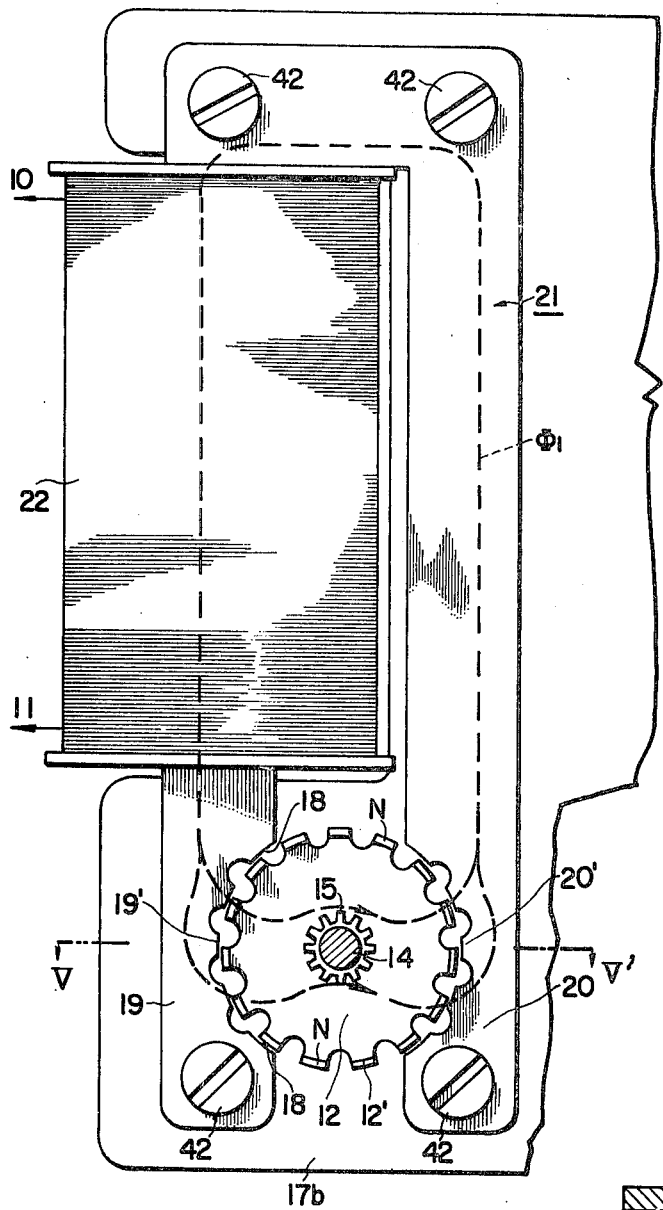
FIG. 4 is a sectional view of a first embodiment of the motor according to this invention, being taken along a section line IV—IV' shown in FIG. 5.

Further referring to FIG. 4, numeral 12 represents a rotor disc made of a soft magnetic material such as permalloy and having a number of radially projecting, salient and equidistance-pitched magnetic poles 12'.

A concentric disc-shaped permanent magnet 13 made of barium ferrite or the like material is fixedly attached to the lower surface of the rotor disc 12 by glueing as an example. This assembly 12; 13 is fixedly mounted on those rotor shaft 14. Each of magnetic poles 12' has a turned-up axial projection as most clearly seen from FIG. 5. Further, a pinion 15 is fixedly mounted on the rotor shaft, while a loose wheel damper 16 is loosely mounted thereon, the shaft 14 being rotatably mounted at its both ends in upper and lower plates 17a and 17b which constitute those of an electronic watch, not specifically shown, and shown partially only.

There is provided a laminated stator plate, generally shown at 21, having an elongated, generally channel configuration and attached fixedly to the lower plate 17b through a plurality of supporting pillars 41 and corresponding set screws 42. The stator plate has a pair of parallel arms 19 and 20, the former arm 19 callying an energizing coil 22. Both ends of this coil are connected to the terminals 10 and 11, respectively. The arms 19 and 20 are formed with two groups of salient poles 19' and 20', respectively, which are arranged on a circle concentric to the rotor disc 12 with small gaps 18 relative to thos 12' on the rotor. The stator pole groups 19' and 20' have opposite magnetic polarities N and S, respectively, as shown by way of example in FIG. 4. As will be more fully described hereinafter these polarities N and S can be reversed depending upon the polarity of current fed to the coil 22. The magnetic poles N and S of the permanent magnet 13 are shown by way of example in FIG. 5. However, if desired, these polarities could be reversed from those shown. The axial end extremity of each of the salient rotor poles 12' will be shown as N-pole on account of the induced magnetism by tight contact with the upper surface of the permanent magnet 13. Stator poles 19' and 20' have a common pole pitch equal to that of the rotor poles 12' and are arranged radially opposite to each other.

Figure 6:
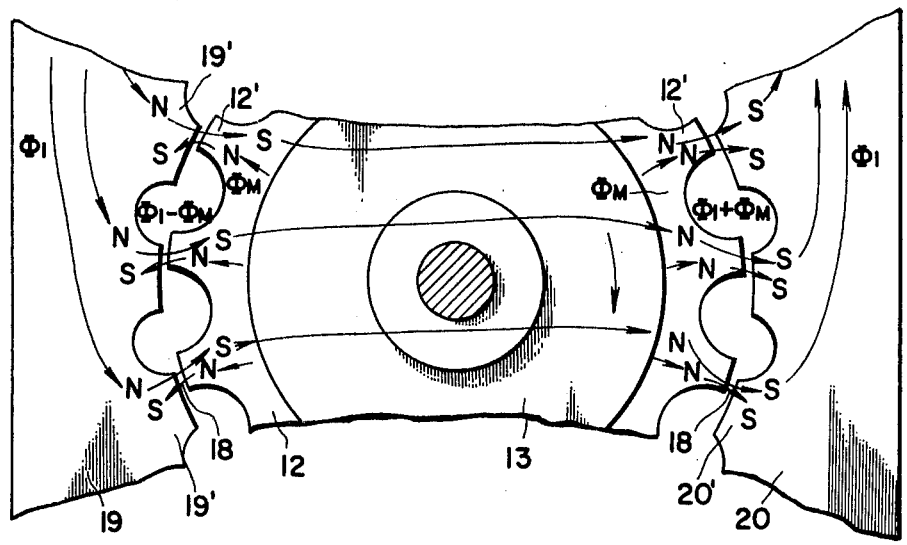
FIGS. 6 and 7 are partial and enlarged plan views of the rotor and stator, showing two operational stages of the motor.
Figure 7:
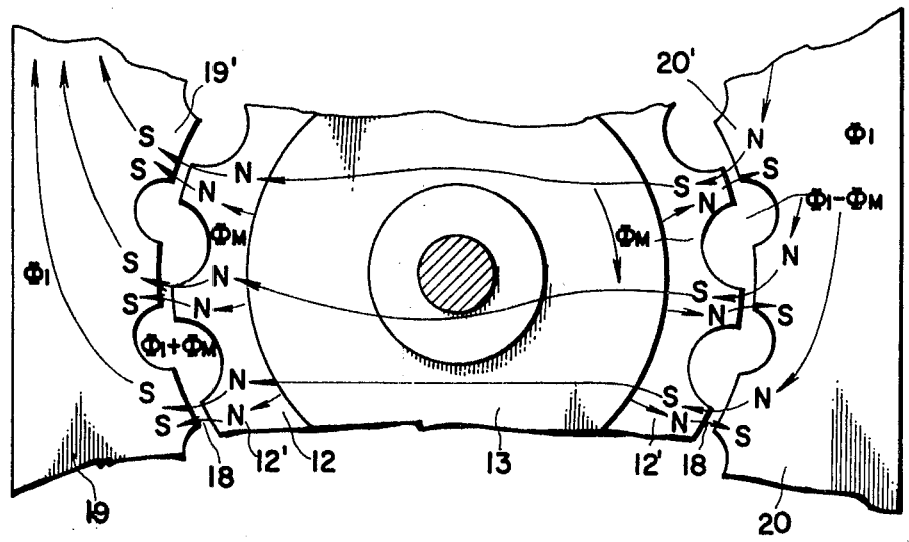

The operation of the first embodiment so far shown and described is described in combination with FIGS. 6 and 7.

Figure 5:
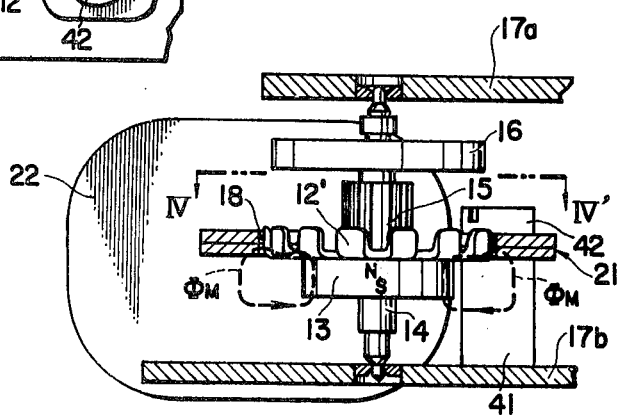
FIG. 5 is a section taken along a section line V—V' shown in FIG. 4.

It will be apparent from the foregoing that the fluxes $\Phi M$ emanating from permanent magnet 13 pass through the main part of rotor disc 12 kept in contact with the magnet, rotor poles 12', air gaps 18, stator poles 19'; 20' and the local ambient space in proximity to these poles, thence back to the permanent magnet, thus constituting closed magnetic circuits as schematically shown in FIG. 5 and thereby magnetizing the related rotor poles with stator poles 19' and 20' to a specific polarity N by way of example and shown in FIG. 4. The related stator poles 19'; 20' are polarized to its opposite polarity S as an example.

When the coil 22 shown in FIG. 4 is energized under the above operating conditions and with the pulsative current fed through the terminals 10 and 11, magnetic fluxes will emanate from the coil and pass through stator arm 19, stator poles 19', air gaps 18 at the left-hand side of FIG. 4, rotor poles 12' positioned in close proximity thereto, main part of the rotor, rotor poles 12' related with right-hand side stator poles 20', related air gaps 18, the right side stator poles 20' and another stator arm 20, thence back to the coil, thereby providing a closed magnetic circuit shown in FIG. 4 in dotted line $\Phi I$. A magnetic polarity of this flux circuit is shown by way of example in FIG. 4 by arrows. However, depending upon the polarity of the fed pulse current to coil 22, the polarity of the flux circuit $\Phi I$ must be reversed, as will be more fully described hereinbelow by reference to FIGS. 6 and 7.

Now referring to FIGS. 6 and 7, the operation of the motor according to this invention will be described in detail.

In the steady running condition of the motor and when the field pole group 19' is energized to N and the opposite field pole group 20' to S, respectively, by the energization of the coil 22, FIG. 4, the magnetic fluxes flowing through the related left-hand side air gaps 18 formed between the field poles 19' and rotor poles 12' will be expressed by $\Phi M - \Phi I$, as shown in FIG. 6. On the other hand, the fluxes flowing through the related right-hand side air gaps 18 formed between the field poles 20' and rotor poles 12' will be expressed by $\Phi M + \Phi I$, as shown again in FIG. 6. Therefore, a turning torque will be induced in the rotor which is thus caused to rotate clockwise in FIG. 6.

Under the steadily rotating condition of the motor, when field pole group 19' is energized to S and those of 20' to N, on the contrary to the foregoing, the mutual relationship between rotor and stator will become as shown in FIG. 7, the magnetic fluxes flowing through the left-hand side air gaps 18 formed between stator pole group 19' and rotor poles 12' will be expressed by $\Phi I + \Phi M$, while those flowing through the right-hand side air gaps 18 formed between stator pole group 20' and rotor poles 12' will be expressed by $\Phi I - \Phi M$, thereby a turning torque being again induced in the rotor which is thus caused to rotate again in clockwise direction.

When a series of alternating voltage pulses as shown in FIG. 3C is fed to the energizing coil 22, it will be seen that the rotor of motor 4 will rotate a pole pitch during application of one cycle of the fed voltage pulses. In this case, the magnetic fluxes ΦI developed from the energizing coil 22 flows through the rotor disc of soft magnetic material at a reduced reluctance, thereby providing a large torque at a small input power.

With application of a series of positive or negative voltage pulses as shown at FIG. 3A or 3D to the energizing coil 22, so as to energize the stator poles periodically to a predetermined polarity, the rotor can rotate in synchronism with the fed pulses. However, in this case, a double period or half-period synchronization wherein the rotor rotates two pole pitches for every one pulse period or a pole pitch for every two pulse periods is liable to disadvantageously occur in practice. Such occasional troubles can be completely avoided by application of alternating voltage pulse series as shown in FIG. 3C or 3F.

In the following, a comparative test which was practically executed will be shown for better understanding of the present invention. A conventional experimental motor was prepared for this purpose according, by way of example, to the teachings disclosed in U.S. Pat. No. 3,469,131. In the following, conventional data will be referred to by denoting I, while those relied upon the inventive teachings will be referred to as II.

Nickel content in the employed soft magnetic material:

|   |   |
|---|---|
| I | 45 wt.%; |
| II | 36 wt.%; |
| Thickness of stator: |   |
| I | 1.8 mm; |
| II | 1.0 mm; |
| Number of stator poles: |   |
| I | 14; |
| II | 10; |
| O.D. of the rotor: |   |
| I | 9.5 mm; |
| II | 9.5 mm; |
| Number of rotor poles: |   |
| I | 15; |
| II | 15; |
| Air gap: |   |
| I | about 0.15 mm; |
| II | about 0.15 mm; |

Source current for the both:

3 volts; 64 Hz; rectangular pulses. The rotor poles 12' were bent up at right angles to the rotor surfaces.

The test results were as follows:

|   | Moment of Inertia of Rotor, mg.mm² | Power Consumption, μA | Rotor Output Torque, mg.mm |
|---|---|---|---|
| I | 4,840 | 95 | 293 |
| II | 4,000 | 78 | 320 |

According to the above test results, it will be seen that in the motor of the present invention having a thinner stator, a reduced poles and made of inferior material such as soft magnetic there exist superior characteristics over the conventionally designed motor.

In the foregoing embodiment shown and described, the permanent magnet magnetized axially was formed into a disc, or more precisely a ring, and attached fixedly to the rotor shaft 14 and directly below the rotor disc 12 when seen in FIG. 5. However, when desired, the permanent magnet can be mounted on the stator or other fixed part of the motor with equal results, as will be more fully described later by reference to FIGS. 15 and 16.

By adopting the magnetic rotor poles 12' bent up at right angles to the main part of the disc rotor 12, an increased intimate magnetic coupling between the rotor and stator can be realized for the realization of an improved motor efficiency without increase of the weight and moment of inertia of the rotor. The turning-up direction must preferably be towards the opposite side to that in which the magnetic lops ΦM emanating from the permanent magnet 13, so as to increase the induced fluxes ΦM, even with use of the same dimensional permanent magnet of the same material.

The use of the stator having a specific plan shape as "U" illustrated in FIG. 4, preferably being of the laminated configuration as only schematically shown at 21 in FIG. 5 will be highly convenient in the attachment of the coil 22 to as well as detachment thereof from the stator 21, in comparison with use of other stator configuration shown by way of example in FIG. 8.

In this conventional motor structure, the stator 100 represents a cut line or joint 23 the provision of which, according to my practical experience, will disturb substantially the assembly and mutual adjustment of the motor parts, in addition to give rise to inferior magnetic efficiency.

In this case of the single phase motor as the first embodiment of the invention so far shown and described, no directional characteristic in the motor revolution could be obtained. Therefore, a conventional starter means must be fitted to the motor, although not shown.

Figure 9:
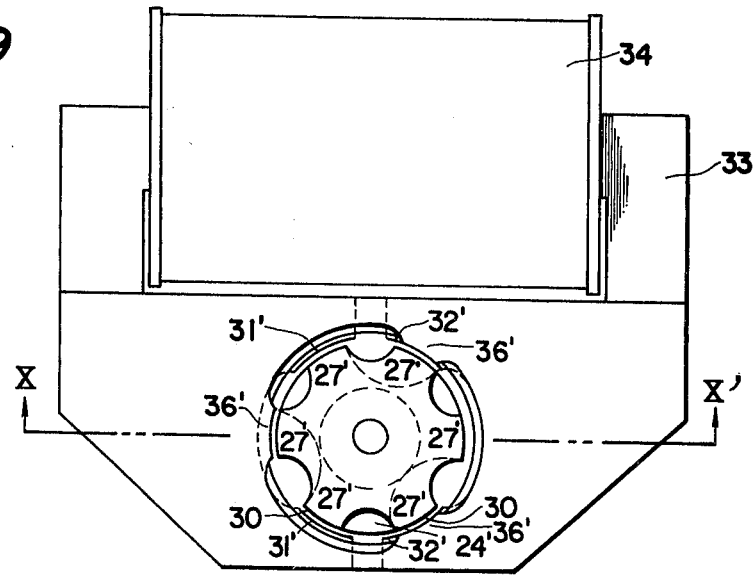
FIG. 9 is a plan view of a second embodiment of the motor according to this invention.
Figure 10:
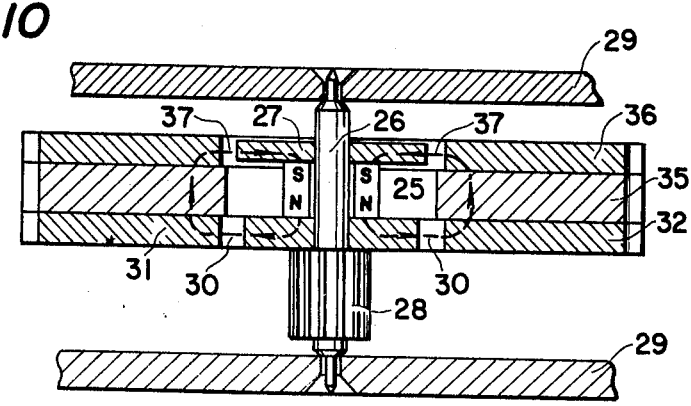
FIG. 10 is a section taken along a section line X—X' shown in FIG. 9.
Figure 11:
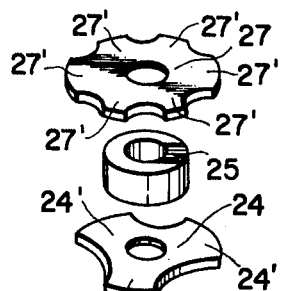
FIG. 11 is an exploded perspective view of several main parts of the second embodiment.

In the case of the second embodiment motor shown in FIGS. 9–11, being again of the single phase mode, such directional characteristic can be provided, and indeed, without any use of the starter. In these Figures, numeral represents a drive pole plate 24 made of soft magnetic material and having three equidistantly arranged pole projections 24'. On one surface, preferably upper surface in this embodiment, of the plate 24, a ring-shaped permanent magnet 25 is mounted coaxially with rotor shaft 26, and an indexing pole plate 27 having six equidistant pole projections 27' is mounted on the upper opposite surface of the permanent magnet 25 again concentrically. The shaft of the rotor thus assembled is provided fixedly with a drive pinion which is kept in drive engagement with a member of the conventional time-keeping and time display gear train, although not shown, the rotor shaft 26 being rotatably mounted at both its ends in upper and lower base plates, only partially shown, of the timepiece, in the similar manner as at 17a and 17b in the foregoing first embodiment.

Figure 12:
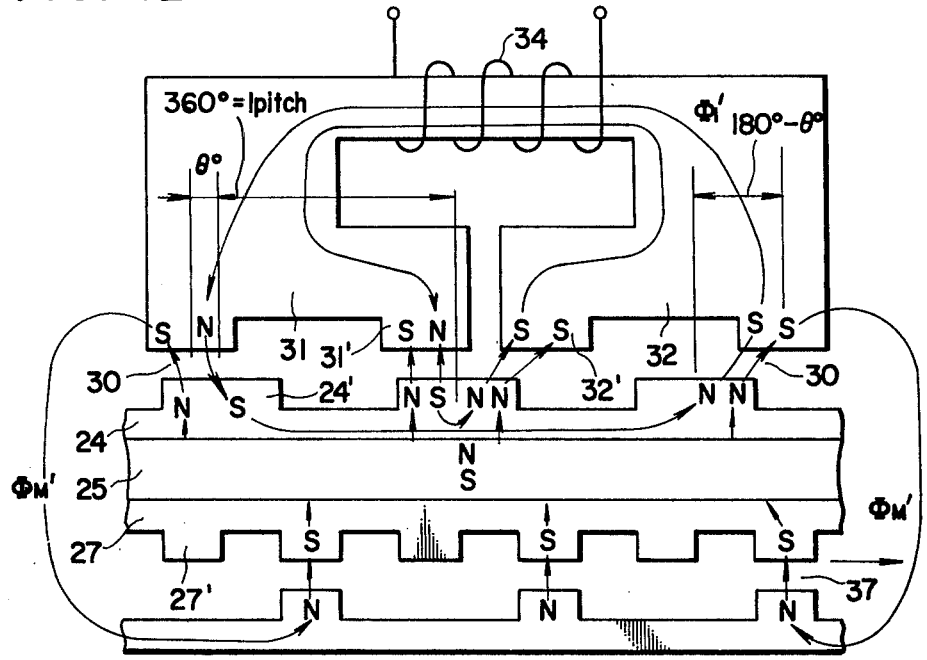
FIGS. 12 and 13 are schematic views for the explanation of the operation of the second embodiment.
Figure 13:
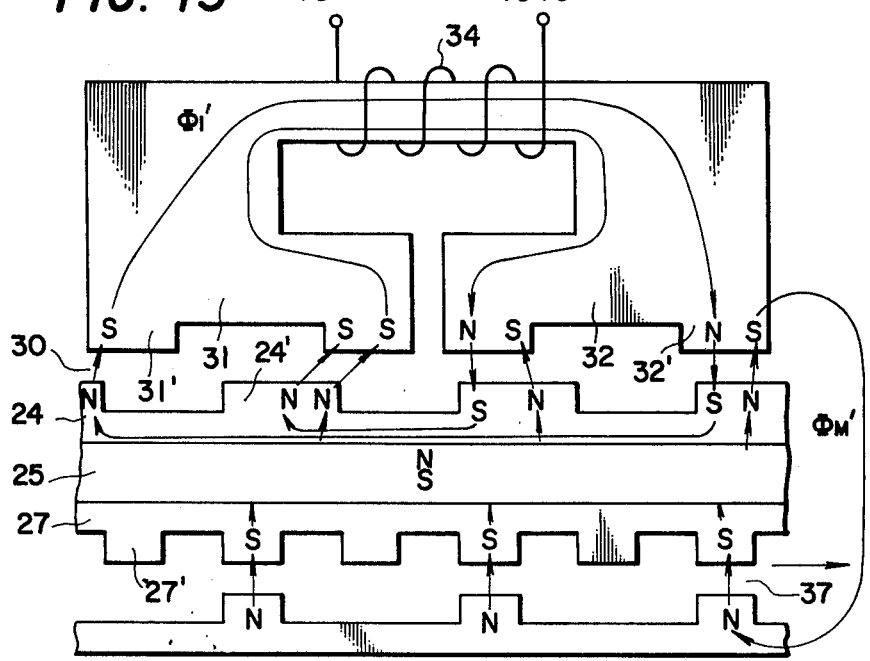

Numerals 31 and 32 represent a pair of stator elements, having their general configuration as shown more clearly in FIG. 11 and formed with two pairs of projecting poles 31' and 32' which are, when assembled the motor elements, arranged in opposition to the rotor poles 24' with reasonable air gaps. Numeral 34, FIGS. 12 and 13, represents an energizing coil wound on the stator. The peripheral pitch is common to the rotor poles and the stator poles. A diametral pair of stator poles 31'; 32' represents a 180°-phase difference to each other.

A non-magnetic plate 35 is formed with a round opening 35' and arranged and fixed, when assembled, in separatedly overlapping manner with the stator element pair 31; 32, the latter thereby being bridged over.

Figure 14:
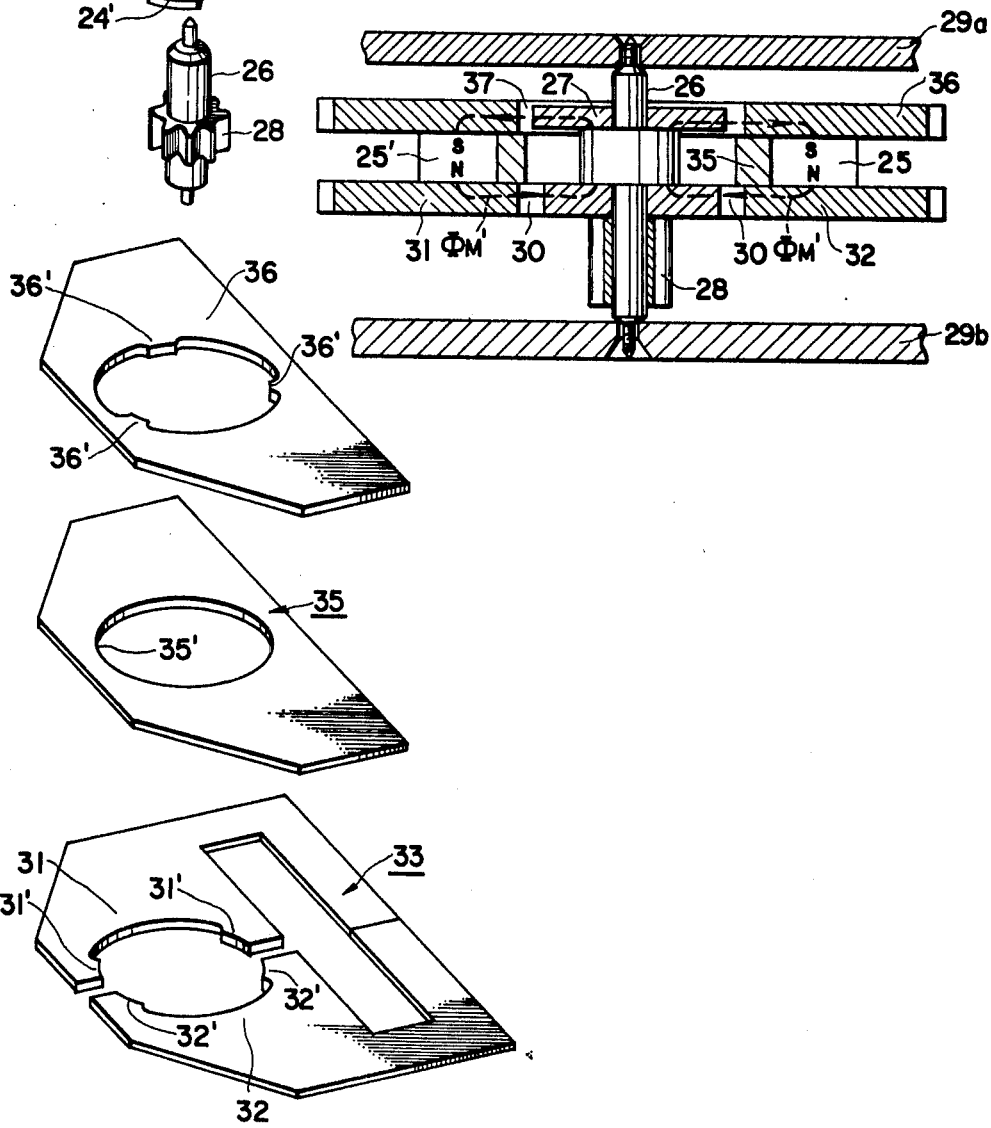
FIG. 14 is a vertical axial section of the second embodiment wherein, however, the permanent magnet has been modified in its arrangement mode.

An auxiliary field plate 36 made of soft magnetic material and having three inwardly projecting poles 36' is arranged, when assembled, in the common plane to the plate 27 and with air gaps 37 relative thereto, the plate 36 being mounted on the non-magnetic plate 35, as seen from FIG. 14. The permanent magnet 25 is axially magnetized.

In the motor thus designed and assembled, the magnetic fluxes emanating from the permanent magnet 25 will pass, as being represented at $\Phi M'$ in FIG. 14, through 24, 24', 30, 31', 32', 31, 32, 35, 36, 36', 37, 27' and 27. The numerals 30 and 37 represent air gaps as shown.

With the permanent magnet 25 magnetized in the manner as shown in FIG. 10, the rotor poles 24' are polarized to N, while the field poles 31' and 32' are polarized to S. The poles 27' are magnetized to S, while the poles 36' are magnetized to N. It should be mentioned at this stage that each of the poles 24' when the rotor is stationary forms angular offset angles of $\theta°$ and $180° - \theta°$, respectively, relative to the field poles 31' and 32'.

When a pulse current flows through the energizing coil 34, stator elements 31; 32 are energized to opposite polarities.

The operation of the foregoing second embodiment motor is as follows:

As shown schematically in the developed plan views of FIGS. 12 and 13, the poles 27' and 36' attract magnetically with each other by the fluxes $\Phi M'$ emanating from permanent magnet 25 and the rotor pole 24' and field poles 31'; 32' are offset angularly by $\theta°$ and $180° - \theta°$, respectively, under the influence of the aforementioned pole polarity conditions. When current flows through the field coil 34 under these conditions, magnetic fluxes $\Phi I'$ similar to that shown at $\Phi I$ in the first embodiment will be induced as shown in FIGS. 12 and 13. In FIG. 12, field poles 31' will be energized to N and poles 32' to S. Thus, differential fluxes $\Phi M' - \Phi I'$ will flow through air gap 30 formed between related field pole 31' and rotor pole 24', when seen at the left-hand side of FIG. 12. On the other, a sum-up fluxes $\Phi M' + \Phi I'$ will flow through air gap 30 formed between field pole 32' and rotor pole 24' when seen at the right-hand side of FIG. 12. Thus, the rotor will receive a torque as shown by a small horizontal arrow appearing at the right-hand lower corner of FIG. 12, thereby performing a half pitch rotation, so as to occupy the relative position shown in FIG. 13.

When a pulse current flows through the coil 34 under the present new relative rotor-and-stator position shown in FIG. 13, magnetic fluxes $\Phi M'$ will be induced again so that sum-up fluxes $\Phi M' + \Phi I'$ flow air gap 30 formed between field poles 32' and rotor poles 24' when seen at the right-hand side of FIG. 13. On the other, differential fluxes $\Phi M' - \Phi I'$ will flow through air gap 30 formed between poles 32' and 24' when seen at the left-hand side of FIG. 13. Thus, the rotor will receive a turning torque, thereby performing a partial rotation by a half pitch, until the rotor and stator take a relative position shown in FIG. 12.

It will be seen, therefore, from the foregoing that by alternate and periodic application of positive and negative half pulse waves as shown at FIG. 3F to the coil 34 through the terminals 10 and 11, FIG. 2, the rotor is caused to rotate a pole pitch and in a certain predetermined direction.

In the present second embodiment, the magnetic fluxes $\Phi I'$ induced by energization of field coil 34 flows along a substantial length in the soft magnetic material of drive pole plate 24 at a highly reduced reluctance, thus developing a large output torque at a small power supplied.

In the present second embodiment, the permanent magnet 25 is sandwiched between drive pole plate 24 and indexing or offsetting pole plate 27, is adapted for offsetting the relative position between related rotor disc poles and stator field poles by a certain angle as a basic principle. A characterizing feature resides in such that the permanent magnet is so designed and arranged that it magnetizes the drive rotor disc as well as the offsetting rotor disc. As a modification from the present embodiment, as shown in FIG. 14, the permanent magnet as at 25' may be mounted on the stator 31; 32, in place of the rotor disc means. The offsetting means could take, if necessary, the form of a mechanical ratchet, although not specifically shown.

Figure 15:
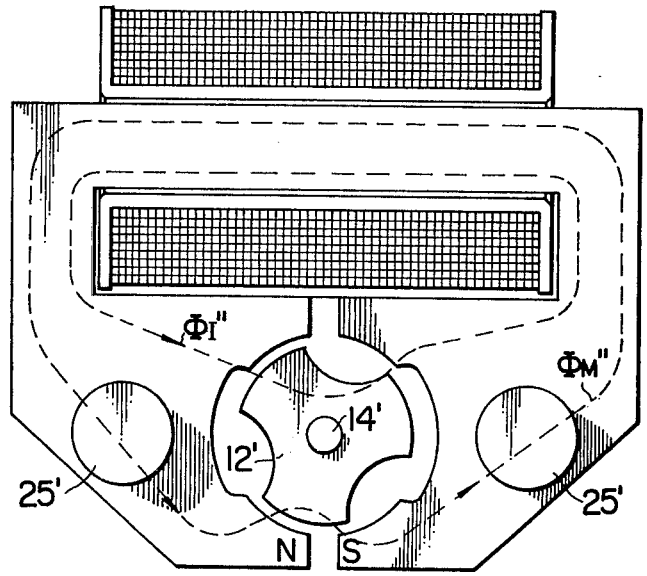
FIGS. 15 and 16 are similar views to FIGS. 9 and 10, respectively, showing a further embodiment wherein permanent magnets are fixedly mounted on the stator.
Figure 16:
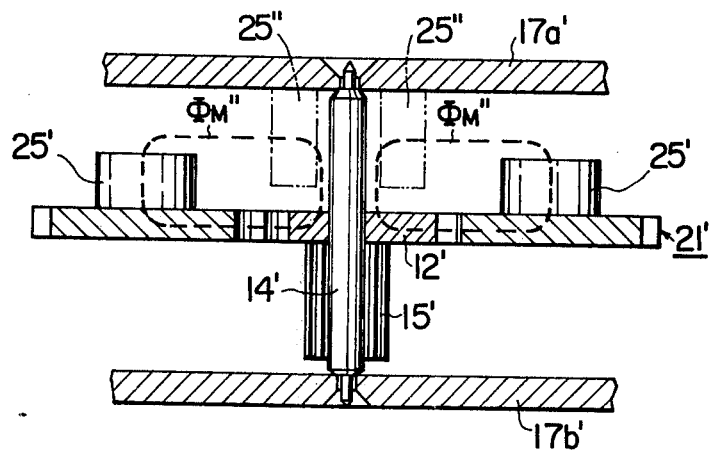

In FIGS. 15 and 16, a further modification is shown. The foregoing permanent magnet means 25' are more specifically shown. In combination therewith, or, when desired, independently therefrom, further magnet means 25'' are provided fixedly on lower surface of the upper base plate 17a' which is similar to that denoted in FIG. 5. Further parts and the magnetic fluxes thus developed could be understood by reference to several further reference symbols, each being attached a prime to the corresponding one used in the foregoing first embodiment. Thus, the present embodiment could be easily understood by reference to the foregoing embodiment and without further analysis.

The embodiments of the invention in which an exclusive property or privilege is claimed are as follows:

1. An electric motor arrangement comprising:
   a rotor being formed as a single rotatable disc made of soft
   magnetic material, said disc having a plurality of radially
   projecting rotor poles disposed equi-distantly on its periphery,
   each of said rotor poles having a turned-up axial projection;
   a concentric disc-shaped permanent magnet being mounted fixedly to the lower surface of said disc;
   a rotor shaft, said disc and said permanent magnet being mounted fixedly on said rotor shaft;
   a stator plate consisting of a pair of parallel arms which form stator elements and are disposed in a 180° — offset manner, said arms having a plurality of diametrically opposite stator poles disposed concentrically to the disc, said stator poles being disposed across a pre-determined air gap from said rotor poles and arranged at equal pitches with said rotor poles; and
   an energizing coil being wound on one of said arms of said stator plate, said permanent magnet magnetizing said rotor poles to a pre-determined magnetic polarity and said stator poles to the opposite magnetic polarity thereby preventing the fluxes flowing through said rotor poles and said stator poles from causing axial forces in said rotor shaft and thus providing a large torque to said rotor shaft at a small input power.

2. An apparatus arrangement comprising:
   a rotor shaft;
   a ring-shaped permanent magnet being mounted coaxially with said rotor shaft;

a drive pole plate made of soft magnetic material and having three projecting rotor poles disposed equi-distantly thereon, said drive pole plate being disposed concentrically on the lower surface of said permanent magnet;

an indexing pole plate having six projecting rotor poles disposed equi-distantly thereon, said indexing pole plate being mounted concentrically on the upper opposite surface of said permanent magnet;

a pair of stator elements having two diametrically pairs of projecting stator poles disposed concentrically to said projecting rotor poles of said drive pole plate, said stator poles being offset to said rotor poles of said drive pole plate at a certain angle, said stator poles being disposed across a pre-determined air gap from said rotor poles of said drive pole plate and arranged at equal pitches with said rotor poles thereof;

an energizing coil being wound on said stator elements;

a non-magnetic plate being formed with a round opening, said non-magnetic plate overlapping said pair of stator elements; and an auxillary stator plate made of soft magnetic material and having three inwardly projecting stator poles, said auxillary stator plate being disposed in the common plane of said indexing pole plate and with air gaps relative thereto, said auxillary stator plate being mounted on said non-magnetic plate, said permanent magnet magnetizing said rotor poles of said drive pole plate and said stator poles of said auxillary stator plate, and magnetizing said rotor poles of said indexing pole plate and said stator poles of said stator elements to the opposite magnetic polarity, thereby preventing the fluxes flowing through said rotor poles of said drive pole plate, said stator poles of said auxillary stator plate, said rotor poles of said indexing pole plate and said stator poles of said stator elements from causing axial forces in said rotor shaft and thus providing a large torque to said rotor shaft at a small input power.

3. An electric motor arrangement comprising:

a rotor shaft;

two ring-shaped permanent magnets each of which is disposed radially at a certain distance from the axis of said rotor shaft;

a drive pole plate made of soft magnetic material and having three projecting rotor poles disposed equi-distantly thereon, said drive pole plate being disposed concentrically on said rotor shaft and on the lower surfaces of said permanent magnets;

an indexing pole plate having six projecting rotor poles disposed equi-distantly thereon, said an indexing pole plate being mounted concentrically on said rotor shaft and on the upper opposite surfaces of said permanent magnets;

a pair of stator elements having two diametrically projecting stator poles disposed concentrically to said projecting rotor poles of said drive pole plate, said stator poles being offset to said rotor poles at a certain angle, said stator poles being disposed across a pre-determined air gap from said rotor poles of said drive pole plate and arranged at equal pitches with said rotor poles of said drive pole plate;

an energizing coil being wound on said stator elements;

a non-magnetic plate being formed with a round opening, said non-magnetic plate overlapping said pair of stator elements; and an auxilliary stator plate made of soft magnetic material and having three inwardly projecting stator poles, said auxilliary stator plate being disposed in the common plane of said indexing pole plate and with air gaps relative thereto, said auxilliary stator plate being mounted on said non-magnetic plate, said permanent magnet magnetizing said rotor poles of said drive pole plate and said stator poles of said auxilliary stator plate to a pre-determined magnetic polarity, and magnetizing said rotor poles of said indexing pole plate and said stator poles of said stator elements to the opposite magnetic polarity thereby preventing the fluxes flowing through said rotor poles of said drive pole plate, said stator poles of said auxilliary stator plate, said rotor poles of said indexing pole plate and said stator poles of said stator elements from causing axial forces in said rotor shaft and thus providing a large torque to said rotor shaft at a small input power.

* * * * *